United States Patent [19]

Ooishi

[11] Patent Number: 4,650,123

[45] Date of Patent: Mar. 17, 1987

[54] ROTARY TYPE ELECTROSTATIC SPRAY PAINTING DEVICE

[75] Inventor: Shogo Ooishi, Toyota, Japan

[73] Assignee: Toyota Jidosha Kabushiki Kaisha, Toyota, Japan

[21] Appl. No.: 843,641

[22] Filed: Mar. 25, 1986

[51] Int. Cl.[4] .......................... B05B 5/04; F16C 32/06

[52] U.S. Cl. .................................... 239/703; 239/223; 384/107

[58] Field of Search ................................ 239/700–703, 239/223–224; 384/100, 107, 114, 120, 121; 415/18, 20

[56] References Cited

U.S. PATENT DOCUMENTS 4,193,644 3/1980 Miyashita et al. .................. 384/107

4,569,562 2/1986 Sato et al. ........................ 384/100 X

FOREIGN PATENT DOCUMENTS 58-124254 8/1983 Japan .................................. 239/703

*Primary Examiner*—Andres Kashnikow

*Attorney, Agent, or Firm*—Oblon, Fisher, Spivak, McClelland & Maier

[57] ABSTRACT

A rotary type electrostatic spray painting device comprising a rotary shaft which is supported by static pressure air bearings in a non-contact state. A drive turbine wheel and a braking turbine wheel are fixed to the rotary shaft. The static pressure air bearings are connected to an air feed pump via an air supply conduit. Pressurized air is injected from air injection nozzles towards the turbine wheels only when the pressure or the flow rate of pressurized air flowing within the air supply conduit exceeds a predetermined level.

11 Claims, 2 Drawing Figures

ROTARY TYPE ELECTROSTATIC SPRAY PAINTING DEVICE

BACKGROUND OF THE INVENTION

1. Field of the Invention

The present invention relates to a rotary type electrostatic spray painting device.

2. Description of the Related Art

In a known rotary type electrostatic spray painting device, a rotary shaft thereof is supported by static pressure air bearings within the housing of the device. A spray head is fixed to the outer end of the rotary shaft, and a turbine wheel for driving the rotary shaft is fixed to the inner end of the rotary shaft. An air injection nozzle which provides a rotational force in one direction for the turbine wheel is arranged in the housing of the device to provide a driving force for rotating the rotary shaft (hereinafter referred to as the drive nozzle), and another air injection nozzle which provides a rotational force in the other direction for the turbine wheel is also arranged in the housing of the device to provide a braking force for the rotary shaft (hereinafter referred to as the brake nozzle). Air under pressure is fed into the static pressure air bearings (hereinafter referred to as the air bearings) so that the rotary shaft is supported by these air bearings in a non-contact state. When a painting operation is carried out, air under pressure is injected towards the turbine wheel from the air injection drive nozzle, and the rotary shaft is thus rotated at a high speed. When the painting device is to be cleaned, to enable a change of the color of the paint to be sprayed, air under pressure is injected towards the turbine wheel from the air injection brake nozzle so that the rotating speed of the rotary shaft is quickly reduced (Japanese Unexamined Utility Model Publication No. 58-124254).

In this rotary type electrostatic spray painting device, a certain amount of air under pressure is necessary to support the rotary shaft by means of the air leavings in a now-contact state, and to keep this pressure to a minimum, the clearance between the bearing faces of the air bearings and the outer circumferential wall of the rotary shaft is very small, i.e., about 20 μm to 70 μm. In addition, to prevent a seizure between the rotary shaft and the air bearings, a surface hardening treatment such as flame spraying ceramic material and the like is applied to the outer circumferential wall of the rotary shaft.

However, in this rotary type electrostatic spray painting device, since the amount of air fed into the air bearings is relatively small, the force supporting the rotary shaft is weak. In addition, the clearance between the bearing faces of the air bearings and the outer circumferential wall of the rotary shaft is very small as mentioned above. Therefore, if an insufficient amount of pressurized air is fed into the air bearings when the rotary shaft is rotated, or when the rotating speed of the rotary shaft is quickly reduced, the rotary shaft comes into contact with the bearing faces of the air bearings during rotation, and as a result, when the rotating speed of the rotary shaft is low, although there is no danger of a seizure between the rotary shaft and the bearing faces of the air bearings, a problem occurs in that a large frictional force is generated between the rotary shaft and the bearing faces of the air bearings, and thus the rotating speed of the rotary shaft is reduced. When the rotating speed of the rotary shaft is high, even if a surface hardening treatment has been applied to the outer circumferential wall of the rotary shaft, a seizure will occur between the rotary shaft and the bearing faces of the air bearings, and thus a problem occurs in that the rotary shaft cannot be rotated.

SUMMARY OF THE INVENTION

An object of the present invention is to provide a rotary type electrostatic spray painting device capable of obtaining a stable rotating motion of the rotary shaft.

According to the present invention, there is provided a rotary type electrostatic spray painting device comprising: a housing; a rotary shaft rotatably arranged in the housing and having an inner end portion and an outer end portion; a spray head fixed to the outer end of the rotary shaft and having a cup shaped inner wall; a feeding means for feeding a paint onto the cup shaped inner wall; a means for generating a negative high voltage and applying same to the spray head; static pressure air bearings arranged in the housing and supporting the rotary shaft in a non-contact state; a turbine wheel fixed to the inner end portion of the rotary shaft; a first air injection nozzle injecting air under pressure towards the turbine wheel to cause the rotary shaft to rotate in one direction; a second air injection nozzle injecting air under pressure towards the turbine wheel to provide a rotational force in the other direction for the rotary shaft and thus reduce the rotating speed of the rotary shaft; an air source producing air under pressure; a first air supply conduit interconnecting the air source to the static pressure air bearings; detecting means arranged in the first air supply conduit for detecting the amount of air under pressure fed into the static pressure air bearings; a second air supply conduit interconnecting the air source to the first air injection nozzle; a first valve means arranged in the second air supply conduit; a third our supply conduit interconnecting the air source to the second air injection nozzle; a second valve means arranged in the third air supply conduit; a drive control means producing output signals denoting that the first valve means and the second valve means should be open; and a valve control means actuating the first valve means and the second valve means in response to a signal output from the detecting means and the signals output from the drive control means to selectively open the first valve means and the second valve means in accordance with the signals output from the drive control means when the amount of air under pressure fed into the static pressure air bearings is larger than a predetermined amount.

The present invention may be more fully understood from the description of a preferred embodiment of the invention set forth below, together with the accompanying drawings.

DESCRIPTION OF A PREFERRED EMBODIMENT

Figure 1:
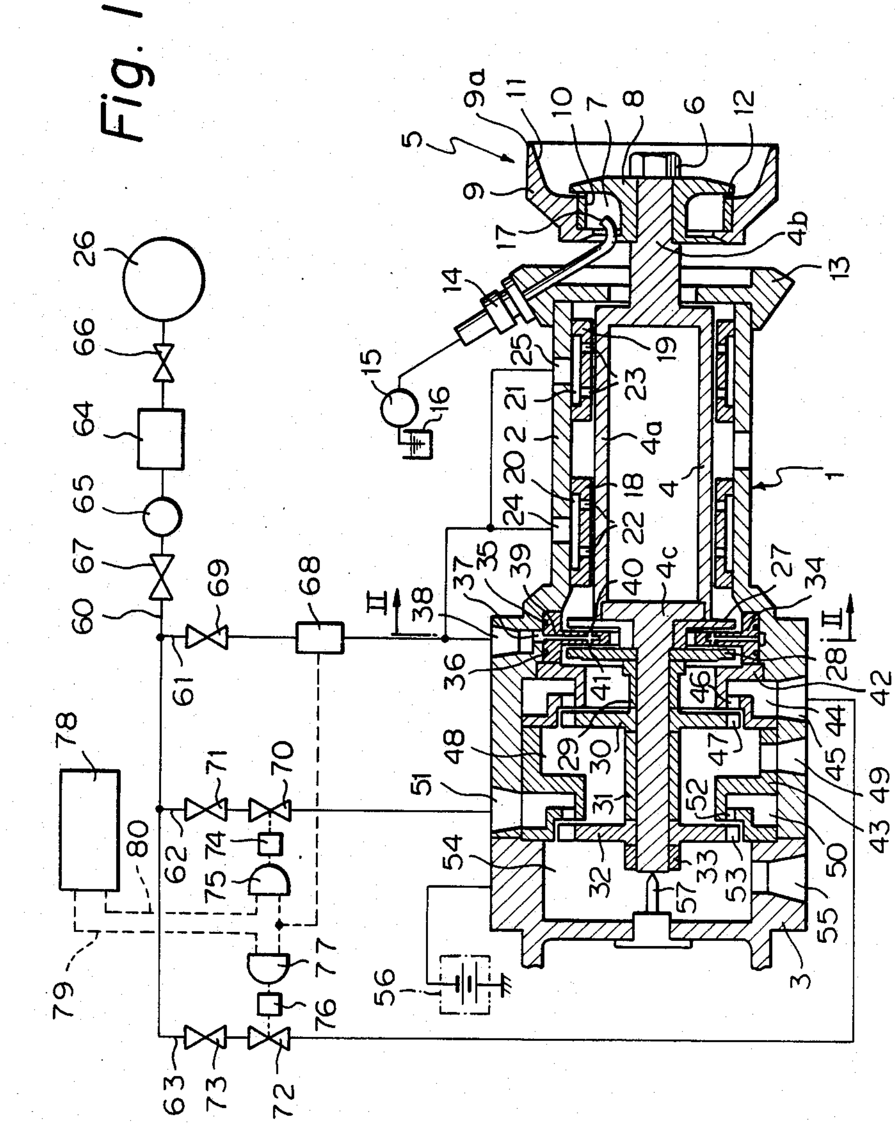
FIG. 1 is a cross-sectional side view of a rotary type electrostatic spray painting device according to the present invention.
Figure 2:
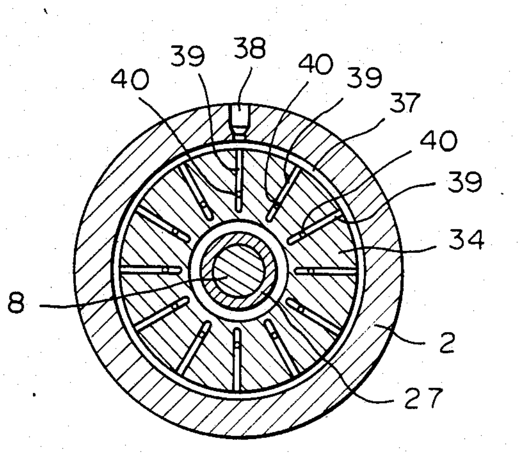
FIG. 2 is a cross-sectional view of the spray painting device, taken along the line II—II in FIG. 1.

Referring to FIGS. 1 and 2, a rotary type electrostatic spray painting device generally designated by reference numeral 1 comprises a hollow cylindrical front housing 2 made of metallic material, and a hollow cylindrical rear housing 3 made of metallic material. The housings 2 and 3 are firmly connected to each other by means of bolts (not shown). A rotary shaft 4 is inserted into the front housing 2. The rotary shaft 4 comprises a hollow cylindrical portion 4*a* located at the central portion thereof, an outer end portion 4*b* integrally formed with the hollow cylindrical portion 4*a*, and an inner end portion 4*c* fixed to the hollow cylindrical portion 4*a*. A spray head 5 made of metallic material is fixed to the outer end portion 4*b* of the rotary shaft 4 by means of a nut 6. The spray head 5 comprises a spray head supporting body 8 defining an annular space 7 therein, and a cup shaped spray head body 9 fixed to the spray head supporting body 8. A plurality of paint outflow bores 12 are formed in an outer cylindrical portion 10 of the spray head supporting body 8. Each of the paint outflow bores 12 is open to the annular space 7 on one hand and is smoothly connected to the cup shaped inner wall 11 of the spray head body 9. An end plate 13 is fixed to the front end of the front housing 2, and a paint injection nozzle 14 is mounted on the end plate 13. The paint injection nozzle 14 is connected to a paint tank 16 via a paint feed pump 15, and a nozzle mouth 17 of the paint injection nozzle 14 is directed towards an inner cylindrical wall of the outer cylindrical portion 10.

As illustrated in FIG. 1, a pair of static pressure radial air bearings 18 and 19 (hereinafter referred to as the radial air bearings) are arranged in the front housing 2, and the rotary shaft 4 is rotatably supported by the radial air bearings 18 and 19 in a non-contact state. The radial air bearings 18 and 19 have annular air chambers 20 and 21 formed therein, respectively, and a plurality of air outflow bores 22, 23 connected respectively to the corresponding annular chambers 20, 21 are formed on the bearing faces of the radial air bearings 18, 19. An air inlet 24 of the air chamber 20 and an air inlet 25 of the air chamber 21 are connected to a pressurized air source 26 formed by an air feed pump.

As illustrated in FIG. 1, a pair of disc shaped runners 27, 28 are rigidly fixed to the inner end portion 4*c* of the rotary shaft 4 via a spacer 29, a drive turbine wheel 30, a spacer 31, and a braking turbine wheel 32 by means of a nut 33. A stationary annular plate 34 is arranged between the runners 27 and 28, and the runners 27, 28 and the annular plate 34 together form a non-contact type static pressure thrust air bearing (hereinafter, thrust air bearing). The runners 27, 28 are slightly spaced from the annular plate 34. The annular plate 34 is airtightly fixed to the front housing 2 via O rings 35, 36. As illustrated in FIGS. 1 and 2, an annular groove 37 extending along the outer circumferential wall of the annular plate 34 is formed in the front housing 2 and connected to the air feed pump 26 via the air inlet 38 formed in the front housing 2. A plurality of air passages 39, each extending radially inwardly from the annular groove 37, are formed in the annular plate 34, and a plurality of air outflow bores 40, 41 extending towards the corresponding runners 27, 28 from the inner end portions of the air passages 39 are also formed in the annular plate 34.

A pair of turbine nozzle holders 42, 43 are arranged in the front housing 2. An annular air chamber 44 is formed between the turbine nozzle holder 42 and the front housing 2 and connected to the air feed pump 26 via an air inlet 45. The air chamber 44 has an air injection nozzle 46 in which a plurality of guide vanes (not shown) are arranged. The air injection nozzle 46 is arranged so that the turbine blades 47 of the drive turbine wheel 30 face the air injection nozzle 46. Air under pressure introduced into the air chamber 44 from the air feed pump 26 is injected from the air injection nozzle 46 into a housing interior chamber 48. At this time, the injecting air provides a rotational force for the drive turbine wheel 30, and thus the rotary shaft 8 is rotated at a high speed. Air in the housing interior chamber 48 is then discharged from a discharge part 49. An annular air chamber 50 is formed between the turbine nozzle holder 43 and the front housing 2 and connected to the air feed pump 26 via an air inlet 51. The air chamber 50 has an air injection nozzle 52 in which a plurality of guide vanes (not shown) are arranged. The air injection nozzle 52 is arranged so that the turbine blades 53 of the braking turbine wheel 32 face the air injection nozzle 52. Air under pressure introduced into the air chamber 50 from the air feed pump 26 is injected from the air injection nozzle 52 into a housing interior chamber 54. At this time, the injected pressurized air provides a rotational force in a direction which causes the braking turbine wheel 32 to act as a brake on the rotary shaft 4. This direction is opposite to the direction of rotation of the rotary shaft 4, which rotation is caused by pressurized air injected from the air injection nozzle 46 towards the turbine blades 47 of the drive turbine wheel 30, causing the drive turbine wheel 30 to rotate the rotary shaft 4. Air in the housing interior chamber 54 is then discharged from a discharge port 55.

The rotary type electrostatic spray painting device 1 is connected to a high voltage generator 56 generating a negative high voltage of −60 KV to −90 KV, and this negative high voltage is applied to the front housing 2 and the rear housing 3. The negative high voltage is then applied to the rotary shaft 4 via an electrode 57, and thus is applied to the spray head 5.

As illustrated in FIG. 1, a main air supply conduit 60 connected to the air feed pump 26 is divided into three air supply conduits 61, 62, and 63. The first air supply conduit 61 is connected to the air inlet 38 of the thrust air bearing and the air inlets 24, 25 of the radial air bearings 24, 25. The second air supply conduit 62 is connected to the air inlet 51 of the turbine nozzle holder 43. The third air supply conduit 63 is connected to the air inlet 45 of the turbine nozzle holder 42. An air heating device 64 for vaporizing water droplets contained in the pressurized air is arranged in the main air supply conduit 60, and a regulator 65 for maintaining the pressurized air at a predetermined pressure is also arranged in the main air supply conduit 60. In addition, a stop valve 66 is arranged in the main air supply conduit 60 upstream of the air heating device 64, and another stop valve 67 is arranged in the main air supply conduit 60 downstream of the regulator 65. A detector 68 for detecting the pressure or the flow rate of the pressurized air flowing within the first air supply conduit 61 is arranged in the first air supply conduit 61 and, in addition, a stop valve 69 is arranged in the first air supply conduit 61. A stop valve 71 and a solenoid valve 70 actuated in response to the output signal of the detector 68 are arranged in the second air supply conduit 62, and a stop valve 73 and a solenoid valve 72 actuated in response to the output signal of the detector 68 are arranged in the third air supply conduit 63. The solenoid valve 70 is connected to the output terminal of an AND gate 75 via a drive circuit 74, and the solenoid valve 72 is connected to the output terminal of an AND gate 77 via a drive circuit 76. One of the input terminals of the AND gate 75 and one of the input terminals of the AND gate 77 are connected to the output terminal of the detector 68, and the other input terminals of the AND gates 75, 77 are connected to the output terminals of a drive control device 78. The output voltage of the detector 68 becomes high when the pressure or the flow rate of the pressurized air flowing within the first air supply conduit 61 exceed a predetermined level, and the solenoid valves 70 and 72 are opened when the output voltages of the corresponding AND gates 75 and 77 become high.

The drive control of the drive turbine wheel 30 and the braking turbine wheel 32 is automatically carried out in response to the signals output from the drive control device 78. When the output voltage appearing in the output lead 79 of the drive control device 78 becomes high, in order to drive the drive turbine wheel 30, if the pressure or the flow rate of the pressurized air flowing within the first air supply conduit 61 is higher or larger than the predetermined level, the output voltage of the AND gate 77 becomes high, and thus the solenoid valve 72 is caused to open. When the output voltage appearing in the output lead 80 of the drive control device 78 becomes high, in order to drive the braking turbine wheel 32, if the pressure or the flow rate of the pressurized air flowing within the first air supply conduit 61 is higher or larger than the predetermined level, the output voltage of the AND gate 75 becomes high, and thus the solenoid valve 70 is caused to open. When the output voltage appearing in either the output lead 79 or the output lead 80 becomes high, if the pressure or the flow rate of the pressurized air flowing within the first air supply conduit 61 is lower or smaller than the predetermined level, the output voltages of the AND gates 75, 77 are low, and thus, the solenoid valves 70, 72 remain closed. In the embodiment illustrated in FIG. 1, the output voltages appearing in both the output leads 79 and 80 do not become high at the same time, and therefore, the solenoid valves 70 and 72 do not open at the same time.

As mentioned previously, the rotary shaft 4 is supported by a pair of radial air bearings 18, 19 and by a thrust air bearing constructed by the runners 27, 28 and the annular plate 34. In the radial air bearings 18, 19, when the pressure or the flow rate of the pressurized air is higher or larger than the predetermined level when the air flows from the air outflow bores 22, 23, an air layer is formed between the outer circumferential wall of the hollow cylindrical portion **4*a* of the rotary shaft 4 and the bearing faces of the radial air bearings 18, 19. Consequently, at this time, the rotary shaft 4 is supported in a non-contact state by this air layer. In the thrust air bearing, when the pressure or the flow rate of the pressurized air is higher or larger than the predetermined level when the air is fed from the air outflow bores 40, 41 into the clearances between the annular plate 34 and the runners 27, 28, an air layer is formed between the annular plate 34 and the runners 27, 28. Consequently, at this time, the runners 27, 28 are supported in a non-contact state by this air layer. That is, if a sufficient amount of pressurized air is fed into the radial air bearings 18, 19 and the thrust air bearing, the rotary shaft 4** is supported by these air bearings in a non-contact state due to the intervention of the air layers therebetween.

When the electrostatic spray painting device 1 is operated, all of the stop valves 66, 67, 69, 71, 73 are open, and pressurized air is fed into the radial air bearings 18, 19 and the thrust air bearing. When the painting operation is carried out, the output voltage appearing in the output lead 79 of the drive control device 78 becomes high. At this time, if an amount of pressurized air sufficient to support the rotary shaft 4 in a non-contact state is fed into the radial air bearings 18, 19 and the thrust air bearing, the solenoid valve 72 is caused to open. As a result, since pressurized air is injected from the air injection nozzle 46, the rotary shaft 4 is rotated at a high speed.

When it is necessary to quickly reduce the rotating speed of the rotary shaft 4, in order to, for example, carry out the cleaning operation required for changing the color of the paint, the output voltage appearing in the output lead 80 of the drive control device 78 becomes high. At this time, if an amount of pressurized air sufficient to support the rotary shaft 4 in a non-contact state is fed into the radial air bearings 18, 19 and the thrust air bearing, the solenoid valve 72 is closed, and the solenoid valve 70 is opened. As a result, pressurized air injected from the air injection nozzle 52 provides a rotational force in a direction which causes the turbine wheel 32 to act as a brake on the rotary shaft 4. This direction is opposite to the direction of rotation caused by pressurized air injected from the air injection nozzle 46, and thus the rotating speed of the rotary shaft 4 is rapidly reduced.

Where an amount of pressurized air sufficient to support the rotary shaft 4 in a non-contact state is not fed into the radial air bearings 18, 19 and the thrust air bearing, the solenoid valves 70 and 72 remain closed, regardless of the output voltage appearing in the output leads 79, 80. As a result, at this time, the injection of pressurized air from the air injection nozzles 46, 52 is stopped, and thus the rotation of the rotary shaft 4 is stopped. Consequently, it will be understood that, according to the present invention, the rotary shaft 4 is rotated only when it is supported by the radial air bearings 18, 19 and the thrust air bearing in a non-contact state.

In the operation of the rotary type electrostatic spray painting device of the present invention, when the rotary shaft 4 is rotated at a high speed, paint injected from the nozzle mouth 17 of the paint injection nozzle 14 onto the inner circumferential wall of the outer cylindrical portion 10 of the spray head 5 flows out onto the inner wall 11 of the spray head body 9 via the paint outflow bores 12, due to the centrifugal force caused by the corresponding rotation of the spray head 5. The paint then spreads over the inner wall 11 of the spray head body 9 and flows on the inner wall 11 in the form of a thin film, until the paint reaches the tip **9*a* of the spray head body 9. As mentioned previously, a negative high voltage is applied to the spray head 5. Consequently, when the paint is sprayed from the tip 9*a* of the spray head body 9** in the form of fine particles, the particles of the sprayed paint are charged with electrons. Since the surface to be painted is normally grounded, the paint particles charged with electrons are attracted towards the surface to be painted due to electrical force, thus forming a layer of paint on the surface to be painted.

According to the present invention, when an amount of pressurized air sufficient to support the rotary shaft in a non-contact state is not fed into the radial air bearings and the thrust air bearing, the rotation of the rotary shaft is stopped. As a result, it is possible to prevent a seizure between the rotary shaft and the bearing faces, and thus ensure that the rotary shaft will be able to rotate. In addition, when the rotary shaft is rotated, the rotary shaft is always supported in a non-contact state. Consequently, since it is possible to rotate the rotary shaft at a predetermined regular speed, a uniform and aesthetically pleasing painted surface can be obtained.

While the invention has been described by reference to a specific embodiment chosen for purposes of illustration, it should be apparent that numerous modifications could be made thereto by those skilled in the art without departing from the basic concept and scope of the invention.

I claim:

1. A rotary type electrostatic spray painting device comprising:
- a housing;
- a rotary shaft rotatably arranged in said housing and having an inner end portion and an outer end portion;
- a spray head fixed to said outer end portion of said rotary shaft and having a cup shaped inner wall;
- feeding means for feeding a paint onto said cup shaped inner wall;
- means for generating a negative high voltage and applying said negative voltage to said spray head;
- static pressure air bearing means arranged in said housing and supporting said rotary shaft in a non-contact state;
- turbine wheel means fixed to said inner end portion of said rotary shaft;
- a first air injection nozzle injecting pressurized air towards said turbine wheel means to rotate said rotary shaft in one direction;
- a second air injection nozzle injecting pressurized air towards said turbine wheel means to provide a rotational force in another direction for said drive shaft and reduce a speed of rotation of said rotary shaft;
- an air source producing pressurized air;
- a first air supply conduit interconnecting said air source to said static pressure air bearing means;
- detecting means arranged in said first air supply conduit for detecting an amount of pressurized air fed into said static pressure air bearing means;
- a second air supply conduit interconnecting said air source to said first air injection nozzle;
- first valve means arranged in said second air supply conduit;
- a third air supply conduit interconnecting said air source to said second air injection nozzle;
- second valve means arranged in said third air supply conduit;
- drive control means producing output signals denoting that said first valve means and said second valve means should be opened; and
- valve control means actuating said first valve means and said second valve means in response to a signal output from said detecting means and signals output from said drive control means to selectively open said first valve means and said second valve means in accordance with the signals output from said drive control means when an amount of pressurized air fed into said static pressure air bearing means is larger than a predetermined amount.

2. A rotary type electrostatic spray painting device according to claim 1, wherein said static pressure air bearing means comprises a pair of static pressure radial air bearings and a single static pressure thrust air bearing.

3. A rotary type electrostatic spray painting device according to claim 2, wherein each of said static pressure radial air bearings comprises a cylindrical bearing face and a plurality of air outflow bores formed on said cylindrical bearing face and connected to said first air supply conduit.

4. A rotary type electrostatic spray painting device according to claim 2, wherein said static pressure thrust air bearing comprises a pair of spaced runners fixed to said outer end portion of said rotary shaft, and an annular plate fixed to said housing and arranged between said runners, said runners having opposed end faces which are slightly spaced from said corresponding runners and having a plurality of air outflow bores formed on said opposed faces and connected to said first air supply conduit.

5. A rotary type electrostatic spray painting device according to claim 1, wherein said turbine wheel means comprises a first turbine wheel having turbine blades arranged to face said first air injection nozzle, and a second turbine wheel having turbine blades arranged to face said second air injection nozzle.

6. A rotary type electrostatic spray painting device according to claim 1, wherein said first air supply conduit, and second air supply conduit and said third air supply conduit are connected to said air source via a common main air supply conduit, and an air heating device is arranged in said main air supply conduit.

7. A rotary type electrostatic spray painting device according to claim 1, wherein said detecting means comprises a detector detecting the pressure of pressurized air flowing within said first air supply conduit and producing an output signal indicating that said pressure of said pressurized air exceeds a predetermined pressure.

8. A rotary type electrostatic spray painting device according to claim 1, wherein said detecting means comprises a detector detecting the flow rate of pressurized air flowing within said first air supply conduit and producing an output signal indicating that said flow rate of said pressurized air exceeds a predetermined flow rate.

9. A rotary type electrostatic spray painting device according to claim 1, wherein said first valve means and said second valve means comprise a solenoid valve.

10. A rotary type electrostatic spray painting device according to claim 1, wherein said valve control means comprises a discriminating circuit by which one of said first valve means and said second valve means is opened when an amount of pressurized air fed into said static pressure air bearing means is larger than a predetermined amount and when said drive control means produces an output signal indicating that one of said first valve means and said second valve means should be opened.

11. A rotary type electrostatic spray painting device according to claim 10, wherein said discriminating circuit comprises a first AND gate and a second AND gate, said first AND gate comprising a first input terminal connected to said detecting means, a second input terminal connected to said drive control means and an output terminal connected to said first valve means, said second AND gate comprising a first input terminal connected to said detecting means, a second input terminal connected to said drive control means and an output terminal connected to said second valve means.

* * * * *